United States Patent Office 3,348,934
Patented Oct. 24, 1967

3,348,934
METHOD OF TREATING THE SURFACES
OF GLASS CONTAINERS
Arthur L. Hinson, Mauricetown, and Dudley C. Smith, Millville, N.J., assignors to Owens-Illinois, Inc., a corporation of Ohio
Filed Dec. 23, 1964, Ser. No. 420,619
6 Claims. (Cl. 65—30)

ABSTRACT OF THE DISCLOSURE

The treatment of a surface portion of an article of glass, to reduce surface alkalinity without creating water marks of insoluble deposits, by converting nongaseous $SO_3$ to gaseous $SO_3$, forming a white bloom by contact of the gaseous $SO_3$ with the glass surface at an elevated temperature, and water washing to remove the bloom.

In the manufacture of glass articles such as vaccine bottles, or ampuls various amounts of alkali which constitute a substantial part of the glass composition, are brought to the surface of the article during its formation. This is particularly true in the case of small glass ampuls which are fabricated from lengths of glass tubing. A length of tubing is heated in a forming machine and shaped into an ampul of prescribed dimensions by sealing the tubing at one end and forming a long, narrow stem at the other end. In these areas which are re-worked by heating the glass, greater amounts of alkali are brought to the surface of the glass or in close proximity to the exposed surface. The amounts of alkali, although minute by ordinary standards, are objectionable in glass containers in certain fields of packaging such as in the pharmaceutical or medicinal industries which utilize glass vaccine bottles or ampuls. The alkalinity can cause deleterious effects on contained pharmacopoeial or other pharmaceutical preparations by reaction therewith to render them unacceptable. Detrimental changes in water in aqueous solutions for injection, for example, which tend to leach alkalies on storage, must be carefully guarded against. For this reason, the interior surface alkalinity of glass containers must be held to a minimum.

Under the prior art, it was known to reduce the alkalinity of glass container interior surfaces by injecting gaseous sulfur dioxide through the neck opening and then injecting an oxidizing reagent. Such methods are described in detail in U.S. Patent Nos. 2,947,117 and 2,947,615, both of which are assigned to the assignee of the present invention.

Experience has shown that the methods of treating the interior surfaces of glass containers disclosed in the above-identified patents result in insoluble water mark deposits being produced in the treated glass surface. For some end uses, the presence of these insoluble deposits is unsatisfactory and, their presence has resulted in rejection of treated ampuls. According to the methods used in the prior art, the sulfur dioxide reacts with the oxidizing agent to form sulfurous and/or sulfuric acid. The acid reacts to leach constituents from the surface of the glass during annealing of the container, the annealing being performed at temperatures in excess of 600° C. The resulting extracted material becomes fused or partially fused to the glass as the glass approaches the maximum temperature of the annealing lehr. It appears as insoluble water mark deposits which are not readily removed by conventional container wash procedures used by the pharmaceutical industry.

Accordingly, it is an object of the present invention to provide a method for reducing the alkalinity of the interior surfaces of glass containers without forming water insoluble deposits.

It is another object of the present invention to provide an economical method of reducing the alkalinity of internal surfaces of glass containers by a direct reaction between $SO_3$ gas and alkalies on such surface.

It is a further object of the present invention to provide a method of treating glass containers wherein sulfuric anhydride is introduced into said container while the entry of condensed moisture therein is retarded.

An additional object of the present invention is to provide a method for treating glass containers or other glass articles wherein a gaseous sulfuric anhydride reacts, upon heating, directly with surface alkalies to form easily removable, water soluble deposits without the forming of liquids.

While the present invention will be described in connection with the treatment of containers to reduce their surface alkalinity, its potential in reducing the surface alkalinity of related glassware such as air tubes, hypodermic syringes, syringe cartridges, and various types of laboratory ware will be readily apparent to those skilled in the art.

The specific nature of this invention as well as other objects and advantages thereof, will become apparent to those skilled in conjunction with the annexed sheets of drawings in which.

According to the present invention, sulfur trioxide ($SO_3$) is brought into contact with the surface to be treated either as $SO_3$ vapor, a mixture of $SO_3$ vapor with other gases or a liquid $SO_3$ which is subsequently vaporized. The sulfur trioxide may be dry (free of water vapor); however, under the preferred embodiment, it is delivered to the container interior by means of ordinary moisture containing air. As used herein the term "moisture" is considered to mean water vapor and should not be construed to include vapors of other substances. Moisture-containing air is preferred because the $SO_3$ reacts with the moisture in the air to instantly produce a visible white fume which is introduced into the container. The presence of the white fume provides a rapid visual check to insure that all containers have been treated. It should be pointed out, however, that the quantity of moisture present in the air is fairly minute and is not enough to condense, as any condensation would result in the formation of droplets. The formation of droplets is undesirable because they react with the $SO_3$ gas to form sulfuric acid and the aforementioned fused deposits and/or insoluble water marks. Under the present invention, the $SO_3$ gas, upon heating, reacts directly with the alkalies on the surface of the glass to thereby produce a bloom, consisting primarily of alkali sulfates, which is readily removed by rinsing the containers with water.

Figure 1:
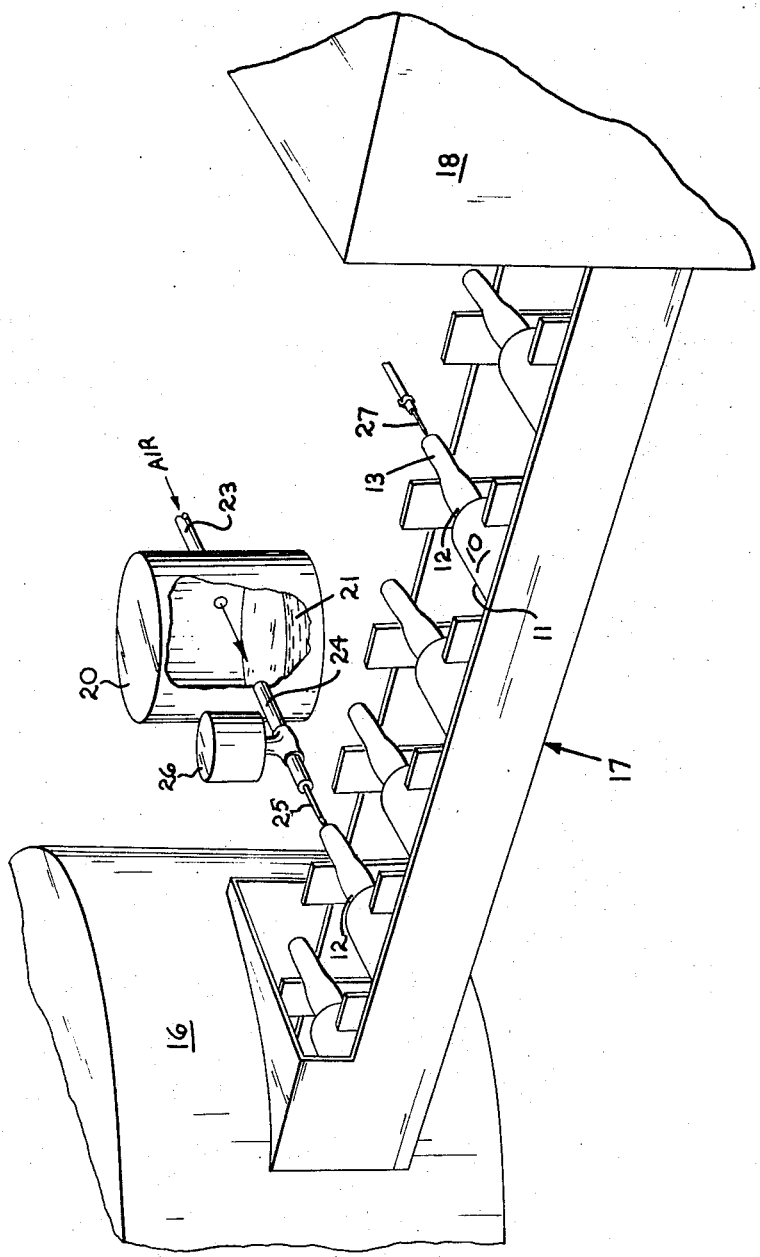
FIGURE 1 is a schematic perspective view illustrating one form of injecting sulfuric anhydride into a container to be treated.

Referring now to FIGURE 1, there is illustrated schematically ampuls 10 having a cylindrical body portion 11, a restricted neck 12 and a tapered stem 13. The extremity of the stem 13 has an opening providing access to the ampul interior. According to the methods well known in the art, the ampul 10 is formed by a forming machine 16 and transported in recumbent position at spaced apart intervals on a conveyor 17 to an annealing lehr 18. A supply reservoir 20 containing a quantity of sulfur trioxide ($SO_3$) 21 in liquid form or as a mixture of liquid and crystals, is provided. The reservoir 20 is provided with an air inlet line 23 and an air outlet line 24. The outlet line has a nozzle 25 positioned to deliver the $SO_3$ vapor into the opening of the ampul stem 13 as the ampuls move thereby. A valve 26 is positioned in outlet line 24 to control the flow of the vapor. Compressed air under a pressure of approximately four pounds per square inch is introduced into the reservoir 20 by means of the inlet line 23. Higher or lower air pressures may be desirable depending on the type of ware being treated, level of treatment required, and production rate. Thus, the portion of the reservoir above the liquid $SO_3$ 21 is occupied by a mixture of $SO_3$ fumes and air. Inasmuch as the air is taken from the atmosphere, it normally contains a small quantity of water vapor. The $SO_3$ vapor reacts with the water vapor to form a visible white fume. The valve 26 is operated by any desired means to inject a quantity of the white fumes into the ampuls as they move past the injection nozzle 25. If desired, a plurality of such injection nozzles, at successive stations, can be utilized instead of a single injection station as shown.

A second nozzle 27 aligned with the path of the ampul openings 14 is connected to any desired air supply means. As the ampuls move past the second nozzle 27, an added puff of compressed air is injected into the ampul 10 to assist in moving the $SO_3$ fumes from the ampul stem 13 into the body 11 thereof. This results in a fairly even distribution of the $SO_3$ fumes throughout the interior of the ampul. If desired, a mixture of $SO_3$ fumes and air, or other compressed gas, as utilized at nozzle 25, can be substituted for compressed air at nozzle 27 to provide a greater concentration of $SO_3$ fumes in the ampuls. The ampuls 10 with the $SO_3$ fumes entrapped therein are then conveyed to the annealing lehr 18 where they are heated to approximately 600° C. whereupon the $SO_3$ vapor reacts to neutralize the surface alkali, producing a film consisting primarily of alkali sulfate which is visible as a white bloom over the interior surface of the ampul. The exact temperature is not critical and heating over a wide range of temperature is sufficient to cause the reaction between $SO_3$ and surface alkali. In fact, the $SO_3$ vapor reacts with the surface alkali during the early stages of heating before the temperature approaches 600° C. The white bloom of alkali sulfates is water soluble and is completely removed when the ampul is washed prior to filling and sealing. Thus, under the present invention, the interior surface of the glass container is treated by the gaseous $SO_3$ reacting directly with the surface alkalies of the container. This is in contrast to the prior art methods which, of necessity, form a condensation containing sulfurous and/or sulfuric acid which results in the formation of non-soluble and objectionable water mark deposits.

The $SO_3$ reacts with the container surface to perform its intended function of neutralizing such surface regardless of whether any water vapor is present in the air used to carry the $SO_3$ into the ampul. As previously noted, however, it is desirable that the air have a small quantity of water vapor therein as the $SO_3$ reacts therewith to give a visible white fume which permits an operator to observe visually whether all of the ampuls entering the annealing lehr have been properly dosed with the $SO_3$ gas. The reaction of the $SO_3$ gas with the water vapor theoretically forms $H_2SO_4$ which accounts for the visible white fumes. However, no condensation takes place during this reaction and the $H_2SO_4$ which is produced is in the form of a fog. Any liquid present is in the form of extremely minute droplets which remain dispersed in the air so that no condensation occurs to form undesirable drops on the glass surface.

Figure 2:
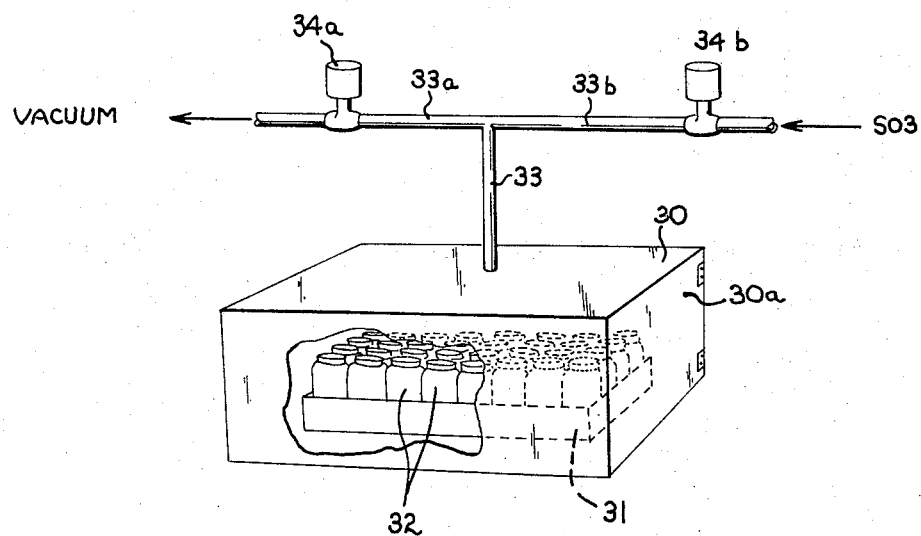
FIGURE 2 is a schematic perspective view illustrating another method of introducing sulfuric anhydride into contact with surfaces to be treated, particularly where it is desired to treat both the inerior and exterior of a container.

Referring now to FIGURE 2, there is illustrated another method for introducing sulfuric anhydride into contact with both the interior and exterior surfaces of containers. Under this embodiment there is provided a chamber 30 adapted to house a tray 31 carrying a plurality of vials 32 or other articles to be treated. The chamber 30 includes a hinged end 30a which can be opened to facilitate the entrance and removal of the tray 31 and vials 32. A fluid supply line 33 is connected to the chamber 30. The supply line 33 has a pair of branches 33a and 33d leading respectively to a vacuum pump (not shown) and a source of sulfur trioxide vapor. Each of the branches 33a and 33b has a valve 34a and 34b, respectively, to control the flow of fluid to and from the chamber 30.

In operation, a tray 31 containing a number of vials 32 or other articles to be treated is placed in the chamber 30. The vacuum pump is then actuated and the valve 34a opened to draw a vacuum in the chamber 30 (the valve 34b being closed during this interval), thus removing a portion of air from each container. Thereafter the valve 34a is closed and the valve 34b is opened. The vacuum serves to draw sulfur trioxide ($SO_3$) through the branch 33b and supply line 33 into the chamber 30 and thus into contact with the vials 32. If desired, the $SO_3$ may be mixed with other gases in various proportions depending upon the concentration desired. The chamber 30 is then heated to an elevated temperature (on the order of 300° C.) to react the $SO_3$ with the surface alkalies.

Treatment of containers may be effected by placing the containers in an atmosphere containing $SO_3$ vapor, permitting the vapor to enter the containers by diffusion and then heating. If containers are placed in an atmosphere containing $SO_3$ vapor at an elevated temperature and then permitted to cool, a reduced pressure will be created within the container which will draw the $SO_3$ vapor into such container.

Additionally, the $SO_3$ may be introduced into containers in liquid form (one or two drops for example) by means of pipetting devices. The liquid $SO_3$ is then vaporized by moderate heating and subsequently reacted by further heating.

It should be noted that while primary attention is given the container interior, under some circumstances it is desirable to treat both the interior and the exterior surfaces, for example to render the surfaces more resistant to repeated washing.

Other means of introducing sulfur trioxide into containers and other articles of glassware will be readily apparent to those familiar with the production and processing of glassware.

The effectiveness of the treatment using sulfur trioxide can be seen from the results listed below.

|  | Titration Before Treatment | Titration After Treatment | Improvement |
|---|---|---|---|
| 5 ml. ampuls | .26 | .05 | .20 |
| 10 ml. ampuls | .18 | .08 | .10 |
| 10 ml. vials | .56 | .25 | .31 |

Titration represents a volume of 0.02 normal sodium hydroxide in 100 millimeters of the water extract solution. The containers were washed, filled with double distilled water and autoclaved for 30 minutes at 121° C.

All of the ampuls treated with sulfur trioxide were carefully examined for the presence of water marks of insoluble deposits and all were found to be completely free of such deposits.

In another series of tests, amounts of sulfur trioxide introduced into an ampul were determined:

| First Test | | Second Test | | Third Test | |
|---|---|---|---|---|---|
| Ampul Size, ml. | Amt. of $SO_3$, mg. | Ampul Size, ml. | Amt. of $SO_3$, mg. | Ampul Size, ml. | Amt. of $SO_3$, mg. |
| 1 | 9.56 | 1 | 4.90 | 1 | 0.45 |
| 5 | 15.94 | 5 | 11.21 | 5 | 0.49 |
| 10 | 29.83 | 10 | 24.76 | 10 | 0.29 |

All of the ampuls in this test were found to be adequately treated and all were free from insoluble deposits. These tests show that less than 0.3 milligram of sulfur trioxide is capable of producing a satisfactory reduction in alkalinity of the ampuls. It is obvious, however, that much larger quantities of sulfur trioxide can be introduced into the ampuls.

From the foregoing, it can be seen that the present invention provides a new and novel method for treating glass containers to reduce the alkalinity thereof which is extremely economical and effective in treating containers so that they are completely free of non-soluble deposits or water marks.

Numerous modifications will become readily apparent and may be resorted to within the spirit and scope of the appended claims.

We claim:
1. A method of treating a surface portion of a glass article, having surface alkalinity, to provide said surface portion with reduced alkalinity and free of water marks of insoluble deposits which comprises the steps of:
   (1) converting nongaseous $SO_3$ to the gaseous state;
   (2) contacting said surface portion at an elevated temperature with said gaseous $SO_3$ to obtain a white bloom on said surface portion; and
   (3) water washing said surface portion to remove the white bloom.
2. The method of claim 1 wherein said conversion of nongaseous $SO_3$ is obtained while said nongaseous $SO_3$ is in contact with said glass article.
3. The method of claim 1 wherein said conversion of said nongaseous $SO_3$ is out of contact with said glass article.
4. The method of claim 1 wherein said conversion is accomplished by passing a gas over the surface of a body of nongaseous $SO_3$ to provide a gaseous mixture containing said gas and $SO_3$.
5. The method of claim 4 wherein
   (1) the article is an ampul or vial having a restricted neck;
   (2) said gas is air; and
   (3) the contact is with the interior surface of the article by introducing said gaseous mixture containing air and $SO_3$ through the restricted neck.
6. The method of claim 5 wherein
   (1) air is injected into the neck of the article subsequent to said introduction of the gaseous mixture; and
   (2) the air of the gaseous mixture contains moisture in an amount upon reaction with said $SO_3$ to form visible white fumes but insufficient to provide condensation of drops of liquid on the glass surface.

References Cited
UNITED STATES PATENTS

| | | | |
|---|---|---|---|
| 1,782,169 | 11/1930 | Kamita | 65—31 |
| 2,947,117 | 8/1960 | Greene et al. | 65—31 |
| 3,199,966 | 8/1965 | O'Connell et al. | 65—30 |
| 3,281,225 | 10/1966 | Hazdra et al. | 65—30 |

DONALL H. SYLVESTER, *Primary Examiner.*

G. R. MYERS, *Assistant Examiner.*